US011434344B2

(12) United States Patent
Joncheray et al.

(10) Patent No.: US 11,434,344 B2
(45) Date of Patent: Sep. 6, 2022

(54) (SUPER)HYDROPHOBIC ISOCYANATE BASED POROUS MATERIALS

(71) Applicant: Huntsman International LLC, The Woodlands, TX (US)

(72) Inventors: Thomas Julien Joncheray, Wavre (BE); Jan Vandenbroeck, Scherpenheuvel-Zichem (BE); Gilles Jean Geumez, Waterloo (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 364 days.

(21) Appl. No.: 15/776,163

(22) PCT Filed: Oct. 12, 2016

(86) PCT No.: PCT/EP2016/074393
§ 371 (c)(1),
(2) Date: May 15, 2018

(87) PCT Pub. No.: WO2017/084809
PCT Pub. Date: May 26, 2017

(65) Prior Publication Data
US 2020/0255620 A1    Aug. 13, 2020

(30) Foreign Application Priority Data

Nov. 16, 2015   (EP) .................................... 15194706

(51) Int. Cl.
| C08G 18/09 | (2006.01) |
| C08G 18/22 | (2006.01) |
| C08G 18/28 | (2006.01) |
| C08G 18/76 | (2006.01) |
| C08J 9/28 | (2006.01) |
| C08J 9/33 | (2006.01) |
| C08J 9/35 | (2006.01) |
| C08L 75/00 | (2006.01) |
| C08L 75/04 | (2006.01) |

(52) U.S. Cl.
CPC .............. *C08J 9/35* (2013.01); *C08G 18/092* (2013.01); *C08G 18/225* (2013.01); *C08G 18/289* (2013.01); *C08G 18/7664* (2013.01); *C08J 9/286* (2013.01); *C08L 75/04* (2013.01); *C08G 2110/0091* (2021.01); *C08G 2115/02* (2021.01); *C08J 2201/0482* (2013.01); *C08J 2201/0502* (2013.01); *C08J 2205/024* (2013.01); *C08J 2205/026* (2013.01); *C08J 2205/028* (2013.01); *C08J 2205/042* (2013.01); *C08J 2205/044* (2013.01); *C08J 2375/04* (2013.01)

(58) Field of Classification Search
CPC .............. C08G 2101/0091; C08J 9/286; C08J 2205/026; C08J 2205/028; C08J 2205/042; C08J 2205/044
See application file for complete search history.

(56) References Cited

U.S. PATENT DOCUMENTS

| 5,478,867 | A | * | 12/1995 | Tabor ................... C08G 18/092 521/128 |
| 5,484,818 | A | | 1/1996 | De Vos et al. |
| 5,942,553 | A | | 8/1999 | Biesmans et al. |
| 5,990,184 | A | * | 11/1999 | Biesmans ............ C08G 18/092 521/64 |
| 6,063,826 | A | | 5/2000 | Biesmans et al. |
| 7,211,605 | B2 | * | 5/2007 | Coronado ............ B01J 13/0091 210/661 |
| 7,691,911 | B2 | * | 4/2010 | Lee ........................... C08J 9/28 521/50 |
| 8,741,976 | B2 | * | 6/2014 | Fricke ................ C08G 18/3243 521/155 |
| 2006/0211840 | A1 | | 9/2006 | Lee |
| 2008/0188577 | A1 | * | 8/2008 | Schmidt ............. C08G 18/4236 521/63 |
| 2009/0029147 | A1 | * | 1/2009 | Tang ..................... C08J 9/0066 428/319.1 |
| 2010/0148109 | A1 | | 6/2010 | Schadler et al. |
| 2012/0111228 | A1 | * | 5/2012 | Fricke .................... C08G 18/10 106/122 |
| 2012/0115969 | A1 | | 5/2012 | Fricke et al. |
| 2012/0142800 | A1 | * | 6/2012 | Fricke ................... C08G 18/12 521/163 |
| 2012/0220679 | A1 | | 8/2012 | Fricke et al. |
| 2014/0147607 | A1 | | 5/2014 | Leventis et al. |

(Continued)

FOREIGN PATENT DOCUMENTS

| WO | 9502009 A1 | 1/1995 |
| WO | 9503358 A1 | 2/1995 |

(Continued)

*Primary Examiner* — Melissa A Rioja

(74) *Attorney, Agent, or Firm* — Huntsman International LLC; Robert Diaz

(57) ABSTRACT

A (super)hydrophobic isocyanate based organic aerogel/xerogel/cryogel having a water contact angle of at least 90° comprising:

a cross-linked porous network structure made of polyurethane and/or polyisocyanurate and/or polyurea, and hydrophobic compounds having before the gelling step at least one isocyanate-reactive group and no isocyanate groups Characterized in that said hydrophobic compounds are covalently bonded within the porous network of the aerogel/xerogel/cryogel and wherein said bondings are created during the gelling step of the formation of the isocyanate based organic aerogel/xerogel/cryogel cross-linked porous network structure.

17 Claims, No Drawings

(56) References Cited

U.S. PATENT DOCUMENTS

| | | | |
|---|---|---|---|
| 2016/0090463 A1* | 3/2016 | Fricke | C08G 18/3243 |
| | | | 521/90 |
| 2016/0229976 A1* | 8/2016 | Fricke | E04B 1/80 |
| 2018/0112054 A1* | 4/2018 | Steiner, III | C08G 18/346 |
| 2018/0118911 A1* | 5/2018 | Joncheray | C08G 18/022 |
| 2018/0258250 A1* | 9/2018 | Joncheray | C08J 9/286 |
| 2019/0276630 A1* | 9/2019 | Bassaganas Turon | C08J 9/28 |
| 2019/0374921 A1* | 12/2019 | Mihalcik | C08G 77/02 |
| 2019/0390025 A1* | 12/2019 | Sakaguchi | C08J 5/046 |

FOREIGN PATENT DOCUMENTS

| | | | | |
|---|---|---|---|---|
| WO | WO-2010039452 A2 * | 4/2010 | | C08J 9/236 |
| WO | 2012000917 A1 | 1/2012 | | |
| WO | WO-2017216034 A1 * | 12/2017 | | C08J 9/286 |

\* cited by examiner

ID
(SUPER)HYDROPHOBIC ISOCYANATE BASED POROUS MATERIALS

CROSS-REFERENCE TO RELATED APPLICATIONS

This application is the National Phase of International Application PCT/EP2016/074393 filed Oct. 12, 2016 which designated the U.S. and which claims priority to European App. Serial No. 15194706.6 filed Nov. 16, 2015. The noted applications are incorporated herein by reference.

FIELD OF INVENTION

The present invention is related to the synthesis of isocyanate based organic porous materials having at least hydrophobic properties, more preferably superhydrophobic properties.

The invention further relates to hydrophobic, more preferably superhydrophobic isocyanate based organic aerogels/xerogels/cryogels, preferably methylene diphenyl diisocyanate (MDI) based aerogels/xerogels/cryogels which comprise hydrophobic compounds covalently incorporated in their porous structure.

The (super)hydrophobic aerogels/xerogels/cryogels according to the invention are suitable for use in a lot of applications such as the use as or in insulation products (thermal and/or acoustic).

BACKGROUND

Aerogels (made using supercritical drying), xerogels (made using ambient pressure drying) and cryogels (made using freeze drying) are porous materials (open pore structure) with pore size typically in the micrometer or even nanometer range. Specific surface areas can be very large (>1 m$^2$/g, as high as 1000 m$^2$/g in some instances).

Aerogels/xerogels/cryogels are typically synthesized by first allowing monomers to react in a solvent to form a gel (gelling step, cross-linked porous network with pores filled with solvent) and then by removal of the solvent. An aerogel is obtained if the solvent is removed from the pores under supercritical conditions (e.g. supercritical $CO_2$). A xerogel is obtained if the solvent is removed (evaporated) from the pores under ambient conditions (i.e. subcritical conditions). A cryogel is obtained if the solvent is removed from the pores by freeze drying. Additional steps in the synthesis such as ageing (a known process in which the gel is left standing for a certain period of time to allow further monomer conversion and/or reinforcement of the polymeric network) after gel formation or various solvent exchanges (to wash away unreacted species and/or to minimize shrinkage during solvent evaporation) can be optionally included to improve final aerogel/xerogel/cryogel properties.

For a variety of applications including thermal insulation, hydrophobic (i.e. water-repellent) aerogels/xerogels/cryogels are preferred. Indeed, when in contact with liquid water, infiltration inside these porous materials would automatically result in deterioration of properties. Water infiltration would fill up the aerogel/xerogel/cryogel pores, which would be dramatic for any application making use of the large specific surface area and/or of the low material density. Moreover, upon drying (i.e. water evaporation) strong capillary forces within the pores could develop, inducing irreversible material shrinkage and densification which would also be detrimental to properties. Hydrophobic aerogels/xerogels/cryogels are defined as materials for which liquid water can "wet" to some extent their outer surface (i.e. water contact angle <150°, but typically >90°) without penetrating the porous structure. Superhydrophobic aerogels/xerogels/cryogels are defined as materials for which liquid water cannot "wet" their outer surface (i.e. water contact angle >150°) without penetrating the porous structure.

Isocyanate based organic aerogels/xerogels/cryogels (comprising polyurethane and/or polyurea and/or polyisocyanurate) as such have been investigated since the early 90's [U.S. Pat. Nos. 5,484,818A, 6,063,826A, 5,942,553A, WO2012000917A1, US2010148109A1, US20120220679A1, US2012115969A1, WO9502009A1, US20060211840, US2014147607A1]. There is however lack of easy methods to achieve (super)hydrophobic properties for these isocyanate based organic aerogels/xerogels/cryogels which is crucial to expand dramatically the range of applications of these isocyanate based organic aerogels/xerogels/cryogels.

WO 95/03358 discloses organic aerogels and more specifically polyisocyanate based aerogels and methods for their preparation. In a particular case where hydrofluorocarbons or $CO_2$ are used as solvents, the polyisocyanate used in the method for making the aerogels is an isocyanate-ended prepolymer made from a polyisocyanate and a substantially fluorinated isocyanate-reactive compound to improve the solubility in the solvent used for making the aerogel.

There is a need to develop a synthesis method to make isocyanate based porous materials hydrophobic and more in particular superhydrophobic in a simple and cost effective way, which would open up a variety of new applications.

GOAL OF THE INVENTION

It is the goal of the invention to develop a synthesis method to provide hydrophobic, more preferably superhydrophobic isocyanate based organic aerogels/xerogels/cryogels which porous structure has hydrophobic compounds covalently bonded to it.

Therefore, the present invention relates to (super)hydrophobic isocyanate based organic aerogels/xerogels/cryogels, synthesis methods to provide said (super)hydrophobic isocyanate based organic aerogels/xerogels/cryogels and use of the (super)hydrophobic isocyanate based organic aerogels/xerogels/cryogels for superior thermal and acoustic insulation and waterproof properties.

SUMMARY OF THE INVENTION

According to the invention, a hydrophobic isocyanate based organic aerogel/xerogel/cryogel having a water contact angle of at least 90° is disclosed. Said aerogel/xerogel/cryogel comprising:
- a cross-linked porous network structure made of polyurethane and/or polyisocyanurate and/or polyurea, and
- hydrophobic compounds having before the gelling step at least one isocyanate-reactive group and no isocyanate groups
- Characterized in that said hydrophobic compounds are covalently bonded within the porous network of the aerogel/xerogel/cryogel and wherein said bondings were created during the gelling step of the formation of the isocyanate based organic aerogel/xerogel/cryogel cross-linked porous network structure.

According to embodiments, the hydrophobic aerogel/xerogel/cryogel of the invention is having superhydrophobic properties and a water contact angle of at least 150°.

According to embodiments, the (super)hydrophobic aerogel/xerogel/cryogel of the invention is comprising:
- 50-99.9%, preferably 60-99%, more preferably 70-99% by weight polyurethane and/or polyisocyanurate and/or polyurea calculated on the total dry weight of the (super)hydrophobic aerogel/xerogel/cryogel, and
- 0.1 to 30%, preferably 0.1 to 20%, more preferably 1 to 10% by weight hydrophobic compounds calculated on the total dry weight of the (super)hydrophobic aerogel/xerogel/cryogel.

According to embodiments, the porous network structure in the (super)hydrophobic aerogel/xerogel/cryogel of the invention is made of polyurethane and/or polyisocyanurate and/or polyurea and the hydrophobic compounds have before the gelling step at least one isocyanate-reactive group and no isocyanate groups and wherein said hydrophobic compounds are incorporated within the porous structure by means of a urethane and/or urea bonding.

According to embodiments, the porous network structure in the (super)hydrophobic aerogel/xerogel/cryogel of the invention has the following properties:
- Porosity: 20 to 99%, preferably 50 to 99%, more preferably 70 to 99%
- Density: lower than 800 kg/m$^3$, preferably in the range 30 to 500 kg/m$^3$, more preferably <300 kg/m$^3$
- Average pore diameter: 0.1 nm to 1 mm, especially <200 μm, preferably <1 μm, especially 1 to 200 nm, more preferably 5 to 100 nm According to embodiments, the (super)hydrophobic aerogel/xerogel/cryogel of the invention is having a lambda value under atmospheric pressure in the range 9-50 mW/m·K at 10° C. together with a low density in the range 50-300 kg/m$^3$.

According to embodiments, the hydrophobic compounds used to make the (super)hydrophobic aerogel/xerogel/cryogel of the invention have a solubility in water <10 g/L preferably <1 g/L more preferably <0.1 g/L at 20° C., and are selected from siloxanes, preferably polyalkylsiloxanes (such as PolyDiMethylSiloxanes (PDMS)), compounds having (long) aliphatic carbon chains having 8 or more carbon atoms (e.g. saturated/unsaturated fatty acid/alcohol derivatives), fluorinated/perfluorinated compounds, Polyethylene, Polypropylene, Polybutadiene, and/or Polyisoprene, . . . .

The invention further discloses a process for making a (super)hydrophobic isocyanate based organic aerogel/xerogel/cryogel, said process comprising the following steps:
a) Providing a polyisocyanate composition, and
b) Optionally providing an isocyanate-reactive composition, and
c) Optionally providing at least one catalyst compound promoting a polyurethane and/or polyurea and/or polyisocyanurate formation (trimerization), and
d) Providing a solvent composition, and
e) Providing hydrophobic compounds having at least 1 isocyanate-reactive group and no isocyanate groups, said compounds being different from b) and suitable to impart a (super)hydrophobicity to the aerogels/xerogels/cryogels obtained in step j), and
f) Optionally providing further additives, and then
g) Combining the compositions/compounds a), d), e) and optionally b) and/or c) and/or f) to form a gel comprising a porous cross-linked polyurethane and/or polyurea and/or polyisocyanurate network having hydrophobic compounds covalently bonded in the network, this step referred to as "gelling" step, and then
h) Optionally removing unreacted species, and then
i) Optionally exchanging solvent, and then
j) Drying (solvent removal) the porous network in order to obtain the (super)hydrophobic isocyanate based organic aerogel/xerogel/cryogel (having a water contact angle >90°, preferably >150°).

According to embodiments, the amount of hydrophobic compounds having before the gelling step at least 1 isocyanate-reactive group and no isocyanate groups used in the process for making the (super)hydrophobic isocyanate based organic aerogel/xerogel/cryogel of the invention is in the range of 0.1 to 30%, preferably 0.1 to 20%, more preferably 1 to 10% by weight calculated on the total weight of the polyisocyanate composition in step a)+isocyanate-reactive compounds in step b)+catalyst compound(s) in step c)+hydrophobic compounds in step e) and further additives in step f) (excluding the solvent in step d)

According to embodiments, the process for making the (super)hydrophobic isocyanate based organic aerogel/xerogel/cryogel of the invention may further comprise after the gelling step, a step wherein the obtained gel is a monolithic gel which is optionally broken or grinded into particles having smaller dimensions.

According to embodiments, the process for making the (super)hydrophobic isocyanate based organic aerogel/xerogel/cryogel of the invention may further comprise after the gelling step, a step wherein the obtained monolithic gel or particles are aged.

According to embodiments, the polyisocyanate composition used in the process for making the (super)hydrophobic isocyanate based organic aerogel/xerogel/cryogel of the invention may be selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate.

According to embodiments, the isocyanate-reactive composition used in the process for making the (super)hydrophobic isocyanate based organic aerogel/xerogel/cryogel of the invention may be selected from the group of aliphatic and aromatic monoamine/polyamine compounds, aromatic and aliphatic polyether and/or polyester monool/polyol compounds and mixtures thereof, preferably polyethers, more preferably polyalkylene polyethers having an average nominal hydroxy functionality of 1-8 and an average molecular weight of 32-8000 g/mol.

According to embodiments, the step of combining the compositions/compounds a), d) and e) and optionally b) and/or c) and/or f) in the process for making the (super)hydrophobic isocyanate based organic aerogel/xerogel/cryogel of the invention is performed by mixing or simply shaking the reaction vessel or by slowly stirring the mixture at temperatures preferably in the range of from about 10° C. to about 50° C., more preferably 15 to 25° C. or at least at a temperature of about at least 10° C. below the boiling point of the solvent used in step d).

According to embodiments, the catalyst compound(s) used in the process for making the (super)hydrophobic isocyanate based organic aerogel/xerogel/cryogel of the invention may be selected from at least a trimerization catalyst selected from quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives and the ratio isocyanates/isocyanate-reactives (NCO Index) is >100, preferably >200, more preferably >300 and wherein the obtained isocyanate based organic aerogel/xerogel/cryogel is a (super)hydrophobic polyisocyanurate (PIR) comprising xerogel/aerogel/cryogel.

According to embodiments, the catalyst compound(s) used in the process for making the (super)hydrophobic isocyanate based organic aerogel/xerogel/cryogel of the invention may be selected from at least a polyurethane catalyst selected from aliphatic and aromatic tertiary amines such as N,N-dimethylcyclohexylamine, organometallic compounds, especially tin compounds such as stannous octoate and dibutyltin dilaurate, alkali metal salts and the ratio isocyanates/isocyanate-reactives (NCO Index) is in the range 50-200, preferably in the range 70-150, more preferably in the range 80-120 and wherein the obtained isocyanate based organic aerogel/xerogel/cryogel is a (super)hydrophobic polyurethane (PUR) and/or polyurea comprising xerogel/aerogel/cryogel.

According to embodiments, the step of removing the solvent in step j) in the process for making the (super)hydrophobic isocyanate based organic aerogel/xerogel/cryogel of the invention is performed by drying the gel comprising the porous network by using supercritical $CO_2$, alternatively the step of drying is performed by evaporating the organic solvents being present in the gel by air-drying (under ambient pressure and ambient temperature until constant weight), drying under vacuum, drying in an oven at elevated temperatures, microwave drying, radiofrequency drying, sublimation, freeze drying or any combination thereof.

According to embodiments, the solvents used in the process for making the (super)hydrophobic isocyanate based organic aerogel/xerogel/cryogel of the invention may be selected from hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers and mixtures of such compounds.

Furthermore, the use of the (super)hydrophobic xerogels/aerogels/cryogels according to invention is disclosed. Said xerogels/aerogels/cryogels may be used as such and/or for preparing foams and/or for combining with fillers and/or to make composite materials, to achieve materials with improved thermal and/or acoustic insulating properties, waterproof properties, selective absorption/adsorption (e.g. oil spillage uptake . . . ) and/or improved mechanical strength, . . . .

Furthermore the use of the (super)hydrophobic xerogels/aerogels/cryogels according to invention as protective coatings and/or films which require waterproof properties or in selective filtration systems is disclosed.

Definitions and Terms

In the context of the present invention the following terms have the following meaning:
1) The term "isocyanate index" or "NCO index" or "index" as used herein means the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.

The NCO value as indicated in the examples is measured using a measurement method based on titration. The isocyanate is reacted with an excess of di-n-butylamine to form ureas. The unreacted amine is then titrated with standard nitric acid to the colour change of bromocresol green indicator or to a potentiometric endpoint. The percent NCO or NCO-value is defined as the percent by weight of NCO-groups present in the product.

Further, it should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The term "polyisocyanate based" or "isocyanate based" xerogel/aerogel/cryogel as used herein means that the xerogels/aerogels/cryogels of the present invention can be of the following types: polyurethane xerogels/aerogels/cryogels, polyurea xerogels/aerogels/cryogels, polyisocyanurate xerogels/aerogels/cryogels, polyisocyanurate/polyurethane xerogels/aerogels/cryogels, polyurea/polyurethane xerogels/aerogels/cryogels, polyallophanate xerogels/aerogels/cryogels, polybiuret xerogels/aerogels/cryogels.

3) The term "Composite" as used herein refers to materials made from two or more constituent materials with significantly different physical or chemical properties, that when combined, produce a material with characteristics different from the individual components. The individual components remain separate and distinct within the finished structure.

4) The terms "organic porous materials", "isocyanate based organic porous materials", "isocyanate based porous materials", and "isocyanate based organic xerogels/aerogels/cryogels" as used herein are limited in this invention towards materials having porosities in the range 20 to 99%, having densities lower than 800 kg/m$^3$, preferably in the range from 30 to 500 kg/m$^3$. The surface area of the xerogel/aerogel/cryogel of the present invention is up to 1500 m$^2$/g. Surface areas can be determined, for example, using the Brunauer, Emmett Teller (BET) method.

5) The expression "monolith" refers to a continuous piece (i.e. defect/crack-free) of a porous material (having solvent-filled pores before the solvent removal step and herein referred to as "monolithic gel" or having gas-filled pores after the solvent removal step). The dimensions of a monolith are typically determined by the size of the container in which gelling is performed. Monoliths can therefore have dimensions as large as hundreds or thousands of cubic centimeters. A grinded/cut monolith results in "particles" (solvent-filled pores before the solvent removal step or gas-filled pores after the solvent removal step). Grinding/cutting can be performed anytime after the gelling step, on a monolith with or without solvent-filled pores. Particle size is determined by the grinding/cutting process.
6) The expressions "isocyanate-reactive compounds", "NCO-reactive compounds" "isocyanate-reactive hydrogen atoms" and "isocyanate-reactive groups" as used herein refer to active hydrogen atoms in hydroxyl and amine groups present in the isocyanate-reactive compounds. Compounds having one hydroxyl group are considered to comprise one reactive hydrogen, compounds having one primary amine group are considered to comprise one reactive hydrogen and one water molecule is considered to comprise two active hydrogens. For the avoidance of doubt, the hydrophobic compounds used to impart hydrophobicity to the (super)hydrophobic aerogels/xerogels/cryogels of the invention are also considered "isocyanate-reactive compounds"
7) The word "average" as used herein refers to number average unless indicated otherwise.
8) "Lambda value" as used herein refers to the thermal conductivity of a material (also known as k value) normally expressed in mW/m·K. The lower the lambda value the more insulating the material (i.e. better thermal insulation performance).
9) "Acoustic insulation" as used herein refers to reducing sound pressure with respect to a specified sound source and receptor.
10) The expression "hydrophobic compounds" refers to molecules having limited solubility in water, i.e. <10 g/L, preferably <1 g/L, more preferably <0.1 g/L at 20° C.
11) The expressions "hydrophobic", "hydrophobicity", or "hydrophobic character" when used for porous materials or aero/xero/cryogels refer to water repellent properties with a water contact angle >90°. In that sense, "hydrophobic", "hydrophobicity" or "hydrophobic character" means that a water droplet placed on the surface of the porous material of the invention forms a contact angle ($\theta$) greater than 90° using the drop shape method of contact angle measurement.
12) The expressions "Superhydrophobic", "superhydrophobicity", or "superhydrophobic character" when used for porous materials or aero/xero/cryogels refer to water repellent properties with a water contact angle >150°. In that sense, "superhydrophobic", "superhydrophobicity" or "superhydrophobic character" means that a water droplet placed on the surface of the porous material of the invention forms a contact angle ($\theta$) greater than 150° using the drop shape method of contact angle measurement.
13) The term "(super)hydrophobic" refers to both hydrophobic and superhydrophobic porous materials in this invention.

DETAILED DESCRIPTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a compound comprising components X and Y" should not be limited to compounds consisting only of components X and Y. It means that with respect to the present invention, the only relevant components of the compound are X and Y.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

According to a first aspect of the invention, a (super) hydrophobic porous material, more in particular an isocyanate based organic aerogel/xerogel/cryogel is provided having hydrophobic compounds incorporated in the porous structure of the isocyanate based organic aerogel/xerogel/cryogel.

The (super)hydrophobic isocyanate based organic aerogels/xerogels/cryogels according to the invention, which can be made in the form of monoliths or particles, comprise an isocyanate based cross-linked porous network structure made of polyurethane and/or polyisocyanurate and/or polyurea and have hydrophobic compounds incorporated in the porous structure of the isocyanate based organic aerogel/xerogel/cryogel.

According to embodiments, the isocyanate based organic aerogels/xerogels/cryogels according to the present invention are nanoporous materials.

According to the invention, (super)hydrophobic isocyanate based organic aerogels/xerogels/cryogels are disclosed comprising a cross-linked porous network structure made of polyurethane and/or polyisocyanurate and/or polyurea, comprising within the porous structure hydrophobic compounds being covalently bonded to the porous network structure. Hydrophobic aerogels/xerogels/cryogels have a water contact angle >90° and superhydrophobic aerogels/xerogels/cryogels have a water contact angle >150°.

According to embodiments, the (super)hydrophobic aerogels/xerogels/cryogels of the invention comprise monoliths or particles having a cross-linked porous network structure wherein said monoliths or particles comprise:
    50-99.9%, preferably 60-99%, more preferably 70-99% by weight polyurethane and/or polyisocyanurate and/or polyurea calculated on the total dry weight of the (super)hydrophobic aerogel/xerogel/cryogel, and
    0.1 to 30%, preferably 0.1 to 20%, more preferably 1 to 10% by weight hydrophobic compounds calculated on the total dry weight of the (super)hydrophobic aerogel/ xerogel/cryogel and wherein said compounds are covalently bonded within the porous network of the aerogel/ xerogel/cryogel.

According to embodiments, the (super)hydrophobic aerogels/xerogels/cryogels of the invention have a porous network structure made of mainly polyurethane and/or polyisocyanurate and/or polyurea structures which comprises hydrophobic compounds being covalently bonded and incorporated in these structures (e.g. by means of a urethane bonding) and wherein said bondings were created during the gelling step of the formation of the isocyanate based organic aerogel/xerogel/cryogel cross-linked porous network structure.

According to embodiments, the hydrophobic compounds being covalently bonded and incorporated in the porous network of the aerogels/xerogels/cryogels of the invention have before the gelling step at least one isocyanate-reactive group being capable of forming a covalent bonding (e.g. a urethane bonding) with a free NCO group of a polyisocyanate.

According to embodiments, the (super)hydrophobic aerogels/xerogels/cryogels of the invention have a cross-linked porous network structure having following properties:
  Porosity: 20 to 99%, preferably 50 to 99%, more preferably 70 to 99%
  Density: lower than 800 kg/m³, preferably in the range 30 to 500 kg/m³, more preferably <300 kg/m³
  Average pore diameter: 0.1 nm to 1 mm, especially <200 μm, preferably <1 μm, especially 1 to 200 nm, more preferably 5 to 100 nm According to embodiments, the (super)hydrophobic aerogels/xerogels/cryogels of the invention have a lambda value under atmospheric pressure in the range 9-50 mW/m·K at 10° C. together with a low density in the range 50-300 kg/m³.

According to embodiments, the (super)hydrophobic aerogels/xerogels/cryogels of the invention have hydrophobic compounds incorporated in their porous structure, said hydrophobic compounds having before the gelling step at least one isocyanate-reactive group and no isocyanate groups and being selected from siloxanes, preferably polyalkylsiloxanes (such as PolyDiMethylSiloxanes (PDMS)), compounds having (long) aliphatic carbon chains having 8 or more carbon atoms (e.g. saturated/unsaturated fatty acid/alcohol derivatives), fluorinated/perfluorinated compounds, Polyethylene, Polypropylene, Polybutadiene, and/or Polyisoprene, . . . . It was surprisingly seen that the presence of low concentrations (e.g. 2 wt % calculated on the total dry weight of the (super)hydrophobic aerogel/xerogel/cryogel) of these hydrophobic compounds are able to achieve superhydrophobicity in the isocyanate based organic aerogels/xerogels/cryogels according to the invention.

According to a second aspect of the invention, a process is disclosed for making the (super)hydrophobic aerogels/xerogels/cryogels of the invention, said process comprising the following steps:
  a) Providing a polyisocyanate composition, and
  b) Optionally providing an isocyanate-reactive composition, and
  c) Optionally providing at least one catalyst compound promoting a polyurethane and/or polyurea and/or polyisocyanurate formation (trimerization), and
  d) Providing a solvent composition, and
  e) Providing hydrophobic compounds having at least 1 isocyanate-reactive group and no isocyanate groups, said compounds being different from b) and suitable to impart (super)hydrophobicity to the aerogels/xerogels/cryogels obtained in step j), and
  f) Optionally providing further additives, and then
  g) Combining the compositions/compounds a), d), e) and optionally b) and/or c) and/or f) to form a gel comprising a porous cross-linked polyurethane and/or polyurea and/or polyisocyanurate network having hydrophobic compounds covalently bonded in the network, this step referred to as "gelling" step, and then
  h) Optionally removing unreacted species, and then
  i) Optionally exchanging solvent, and then
  j) Drying (solvent removal) the porous network in order to obtain the (super)hydrophobic isocyanate based organic aerogel/xerogel/cryogel (having a water contact angle >90°, preferably >150°).

It is an advantage of the process according to the invention that only low amounts of hydrophobic compounds are required (in step e)) in order to achieve hydrophobicity, more in particular to achieve superhydrophobicity. This means that the composition of the resulting isocyanate based organic aerogel/xerogel/cryogel will not be altered significantly and the properties arising from the polyurethane, polyisocyanurate and/or polyurea matrix are maintained.

According to embodiments, the obtained gel is a monolithic gel which may be optionally broken or grinded into particles having smaller dimensions.

According to embodiments, the process for making the (super)hydrophobic aerogels/xerogels/cryogels of the invention further comprises after the gelling step, a step wherein the obtained monolithic gel or particles are aged.

According to embodiments, the polyisocyanate composition is preferably selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenyl ene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the polyisocyanate composition comprises mixtures of isocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

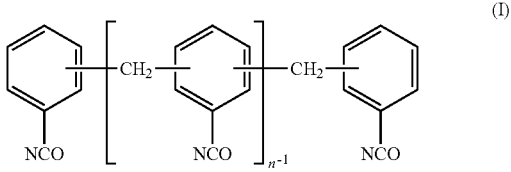

(I)

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the isocyanate-reactive composition is selected from isocyanate-reactive compounds having active-hydrogen atoms. These isocyanate-reactive compounds can be selected from the group of aliphatic and aromatic monoamine/polyamine compounds, aromatic and aliphatic polyether and/or polyester monool/polyol compounds and mixtures thereof. Among the polyethers in particular suitable herein are the polyalkylene polyethers.

The monool and/or polyol compounds suitable in the present invention preferably have an average nominal hydroxy functionality of 1-8 and an average molecular weight of 32-8000 g/mol. Mixtures of monools and/or polyols may be used as well. Examples of such monools are methanol, ethanol, propanol, butanol, phenol, cyclohexanol, hydroxy acrylates (e.g. HEMA, hydroxy ethyl methacrylate) and hydrocarbon monools having an average molecular weight of 32-6000 g/mol like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000 g/mol, polyester polyols having an average molecular weight of 200-8000 g/mol, polyether polyester polyols having an average molecular weight of 200-8000 g/mol and polyether polyols having an average molecular weight of 200-8000 g/mol. Such monools and polyols are commercially available. Useful examples are Daltocel® F555 and Daltocel® F442, which are all polyether triols from Huntsman, Voranol® P400 and Alcupol® R1610, which are polyether polyols from DOW and Repsol®, respectively, and Priplast® 1838 and 3196 which are high molecular weight polyester polyols from Croda, and Capa® 2043 polyol, a linear polyesterdiol of average MW of about 400 g/mol from Perstorp, and K-flex® polyols 188 and A308 which are polyester polyols from King Industries having a MW of about 500 and 430 g/mol respectively, and aromatic polyester polyols like Stepanpol® PH56 and BC180 having average molecular weights of about 2000 g/mol and 600 g/mol respectively, and Neodol® 23E which is an aliphatic monool from Shell. Most preferred are polyester and polyether polyols having an average molecular weight of 200-6000 g/mol and an average nominal functionality of 1-8.

According to embodiments, the amount of hydrophobic compounds to be added in the step of providing hydrophobic compounds having at least 1 isocyanate-reactive group and no isocyanate groups is such that the amount of hydrophobic compounds is in the range of 0.1 to 30%, preferably 0.1 to 20%, more preferably 1 to 10% by weight calculated on the total weight of the reactive composition comprising the polyisocyanate composition, all isocyanate-reactive compounds having isocyanate-reactive hydrogen atoms, the catalyst compounds, the hydrophobic compounds, and optional further additives (excluding the solvent used).

According to embodiments, the (super)hydrophobic aerogels/xerogels/cryogels of the invention have hydrophobic compounds incorporated in their porous structure, said hydrophobic compounds having before the gelling step at least one isocyanate-reactive group and no isocyanate groups and being selected from siloxanes, preferably polyalkylsiloxanes (such as PolyDiMethylSiloxanes (PDMS)), compounds having (long) aliphatic carbon chains having 8 or more carbon atoms (e.g. saturated/unsaturated fatty acid/alcohol derivatives), fluorinated/perfluorinated compounds, Polyethylene, Polypropylene, Polybutadiene, and/or Polyisoprene, . . . .

According to embodiments, the catalysts used to promote a polyurethane and/or polyurea and/or polyisocyanurate formation (trimerization) in the gelling step g) are such that the polyisocyanate/catalyst weight ratio varies between 1 and 50000. The preferred polyisocyanate/catalyst weight ratio depends on formulation parameters such as for instance the amount/type of polyisocyanate used, the amount/type of isocyanate-reactive compound, the reaction/cure temperature, the solvent used, additives used, the index, . . . .

Polyurethane catalysts for use in the present preparation methods include any of those catalysts known in the art to promote urethane and/or urea reaction. Suitable urethane catalysts include aliphatic and aromatic tertiary amines such as N,N-dimethylcyclohexylamine, organometallic compounds, especially tin compounds such as stannous octoate and dibutyltin dilaurate, alkali metal salts.

Trimerisation catalysts for use in the present preparation method include any isocyanate trimerisation catalyst known in the art such as quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present method are Polycat® 41 available from Abbott Laboratories, and Dabco® TMR, TMR-2 and TMR-4 available from Air Products.

Mixtures of trimerisation catalysts and urethane catalysts can be used in any combination. The composition of the catalyst package will depend on the desired reaction profile.

According to embodiments, the step of combining the compositions/compounds a), d), e) and optionally b) and/or c) and/or f) in the process for making the (super)hydrophobic aerogels/xerogels/cryogels of the invention is performed by mixing or simply shaking the reaction vessel or by slowly stirring the mixture at temperatures in the range of from about 10° C. to about 50° C., preferably 15 to 25° C., a temperature of about at least 10° C. below the boiling point of the solvent used being preferred. Preferably, the mixture is left standing for a certain period of time to form a gel. This time period varies from 1 minute to several weeks depending on the system and the targeted pore size and density. The resulting gel can optionally be aged as well from a few hours to several weeks.

According to embodiments, the step of combining the polyisocyanate composition, catalyst compound(s), solvent, hydrophobic compounds, and optionally the isocyanate reactive composition and additives is such that a mainly polyisocyanurate (PIR) comprising gelling formulation is achieved. To achieve a mainly polyisocyanurate (PIR) comprising gelling formulation, the catalyst used is selected from at least a trimerization catalyst and the ratio isocyanates/isocyanate-reactives (NCO Index) is >100, preferably >200, more preferably >300.

According to embodiments, the step of combining the polyisocyanate composition, the isocyanate-reactive composition, catalyst compound(s), hydrophobic compounds, solvent and optional additives is such that a mainly polyurethane (PUR) and/or polyurea comprising gelling formulation is achieved. To achieve a mainly polyurethane/polyurea comprising gelling formulation, the catalyst compound(s) used are selected from at least a polyurethane catalyst and the ratio isocyanates/isocyanate-reactives (NCO Index) is in the range 50-200, preferably in the range 70-150, more preferably in the range 80-120.

According to embodiments, the step of combining the polyisocyanate composition, the isocyanate-reactive composition, catalyst compound(s), hydrophobic compounds, solvent and optional additives is such that a mainly polyisocyanurate (PIR) and/or polyurethane (PUR) and/or polyurea comprising gelling formulation is achieved.

According to embodiments, the step of removing the solvent in step j) in the process for making the (super) hydrophobic aerogels/xerogels/cryogels of the invention is performed by drying the gel comprising the porous network by using supercritical $CO_2$, alternatively the step of drying is performed by evaporating the organic solvents being present in the gel by air-drying (under ambient pressure and ambient temperature until constant weight), drying under vacuum, drying in an oven at elevated temperatures, microwave drying, radiofrequency drying, sublimation, freeze drying or any combination thereof.

Supercritical drying of the gel to synthesize an aerogel involves placing the solvent-filled gel in a temperature-controlled pressure vessel and bringing the vessel to a pressure above the critical pressure of the solvent (for example by filling with nitrogen gas or pumping additional solvent). At that point the vessel is then heated above the critical temperature of the solvent. The pressure is then slowly released from the vessel while keeping a constant temperature. At atmospheric pressure and after a cool down period the aerogel is removed from the vessel.

Before the supercritical drying step the gelling solvent may be exchanged with another solvent more suitable for supercritical drying, for example liquid carbon dioxide, possibly via an intermediate solvent such as acetone or via liquid carbon dioxide containing modifiers.

According to embodiments, the step of drying the gel comprising porous polyurethane and/or polyurea and/or polyisocyanurate monoliths or particles (solvent removal from the solvent-filled pores) for making a (super)hydrophobic isocyanate based organic xerogel according to the invention is performed by evaporating the organic solvent being present in the gel under ambient conditions (e.g. by air-drying under ambient pressure until constant weight), drying under vacuum, drying in an oven at elevated temperatures, microwave drying, radiofrequency drying or any combination thereof. The drying step can take from 10 minutes to a few days but is generally less than 6 hours.

Before the solvent evaporation step in the xerogelsynthesis the gel solvent may be exchanged with another solvent, for example a solvent with a higher vapor pressure (lower boiling point) and/or lower surface tension.

According to embodiments, the step of drying the gel comprising porous polyurethane and/or polyurea and/or polyisocyanurate monoliths or particles (solvent removal from the solvent-filled pores) for making a (super)hydrophobic isocyanate based organic cryogel according to the invention is performed by removal of the organic solvent being present in the gel under freeze drying or sublimation conditions.

Before the solvent removal step in the cryogelsynthesis the gel solvent may be exchanged with another solvent more suitable for freeze drying or sublimation conditions.

According to embodiments, the solvents to be used in the preparation method according to the present invention may be selected from hydrocarbons, aromatics, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone and methyl ethyl ketone.

Suitable alkyl alkanoates which may be used as solvent include methyl formate, methyl acetate, ethyl formate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane, tetrafluoropropane and pentafluoropropane.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene

Suitable aromatic solvents include toluene, benzene, xylenes . . . .

Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Another suitable solvent is N-methyl pyrolidone.

Preferred solvents for use in the method according to the present invention are dichloromethane, acetone, n-pentane, ethyl acetate, methyl ethyl ketone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures.

Another suitable solvent is liquid carbon dioxide ($CO_2$). Liquid carbon dioxide may be used under various pressures (above 63 bar) and temperatures. Also sub- or supercritical carbon dioxide can be used as a solvent. The solvent power of sub- or supercritical carbon dioxide can be adjusted by adding suitable modifiers such as methanol, ethanol, acetone, HCFC 22, dichloromethane in levels of 0.1 to 50% by volume. In case liquid carbon dioxide is used as solvent it has been shown to be an advantage to use as polyisocyanate in the preparation of the present aerogels/xerogels/cryogels a fluorinated isocyanate-ended prepolymer made from a polyisocyanate and a fluorinated isocyanate-reactive compound such as a fluorinated monol or diol.

Other suitable solvents include C1-C8 hydrocarbons in sub- or supercritical state. The solvent power of these sub- or supercritical C1-C8 hydrocarbons can be adjusted by using suitable modifiers.

Further suitable additives to be used in the process of the present invention and further suitable processing methods are described in WO 95/03358, which is incorporated herein by reference.

According to a third aspect of the invention, various uses and applications of the (super)hydrophobic xerogels/aerogels/cryogels of the present invention are disclosed. A few examples are described hereinafter.

The (super)hydrophobic xerogels/aerogels/cryogels according to the invention can be blended in the polyisocyanate and/or polyol compositions for use in preparing polyurethane foams. Subsequent foaming leads to foams loaded with solid polyisocyanate-based aerogel/xerogel/cryogel particles which may enhance physical/mechanical properties, thermal insulation properties, acoustic insulation properties and fire performance of the resultant foams. This concept can also be used in the preparation of other types of foam such as thermoplastic foams made via an extrusion process.

The (super)hydrophobic xerogels/aerogels/cryogels according to the invention can be glued together using binders or adhesives. A block of material is then obtained which consists mainly of xerogels/aerogels/cryogels. Said blocks can be made by putting the xerogels/aerogels/cryogels particles/powders in a mould and compressing them with or without temperature increase and optionally under inert atmosphere to make a compacted xerogel/aerogel/cryogel block.

The (super)hydrophobic xerogels/aerogels/cryogels according to the invention can be combined with other materials (e.g. fillers) to create novel composite materials having improved thermal insulating properties (lower lambda values), improved acoustic insulation properties and/or improved fire retardancy compared to state of the art isocyanate based composites.

The (super)hydrophobic xerogels/aerogels/cryogels according to the invention can be used for thermal insulation purposes, for example in vacuum panels.

The (super)hydrophobic xerogels/aerogels/cryogels according to the invention can be used for thermal insulation and/or acoustic insulation. For example to make an acoustic and/or thermal insulation panel or a thermal and/or acoustic encapsulating insulation shield suitable for encapsulating complicated 3D shaped objects.

Furthermore, the invention discloses the use of the (super)hydrophobic xerogels/aerogels/cryogels according to the invention as protective coatings and/or films which require waterproof properties (e.g. floating open cell/breathing material). To make said coatings or films made of (super)hydrophobic xerogels/aerogels/cryogels according to the invention, the gel forming composition g) is for instance poured out on a surface of interest before gelling and subsequent solvent removal.

Furthermore, the invention discloses the use of the (super)hydrophobic xerogels/aerogels/cryogels according to the invention as a (super)hydrophobic porous filter system to achieve selective filtration.

Furthermore, the invention discloses the use of the (super)hydrophobic xerogels/aerogels/cryogels according to the invention to achieve selective absorption/adsorption (e.g. oil spillage uptake . . . ).

The independent and dependent claims set out particular and preferred features of the invention. Features from the dependent claims may be combined with features of the independent or other dependent claims as appropriate.

The above and other characteristics, features and advantages of the present invention will become apparent from the detailed description, taken in conjunction with the accompanying examples which illustrate the principles of the invention.

EXAMPLES

Compounds used:
Suprasec® 2085 (from Huntsman): a polymeric MDI with NCO=30.5 and an average functionality of 2.9
Dabco® K15 (from Air Products): a solution of 75 wt % potassium octoate and 25 w % of diethylene glycol. Potassium octoate is a trimerization catalyst that promotes the polyisocyanurate reaction.
Acetone
n-Pentane
Mono aminopropyl polydimethylsiloxane (MCR-A11 from Gelest, MW=800-1000 g/mol)
n-Butanol Experimental Methods Xerogel density $\rho_x$ (in kg/m$^3$) was estimated by dividing the mass of xerogel particles (measured with an analytical balance) by their volume (measured with a caliper).
Xerogel porosity P (in %) was estimated from the following formula: $P=100 \times (1-\rho_x/\rho_s)$, with $\rho_s$ the density of the solid network (assumed to be around 1200 kg/m$^3$ for PIR resins) and $\rho_x$ the density of the xerogel
Pore diameter was estimated by visual observation of Scanning Electron Microscopy images.

Comparative Example 1: Synthesis of a Non Hydrophobic PIR Xerogel

The xerogel was prepared by mixing the following chemicals in a glass vial:
1/0.5 g of PIR catalyst solution (10 wt % Dabco® K15 in acetone)
2/7.6 g of acetone
3/0.90 g of n-pentane
4/1 g of polymeric MDI (Suprasec® 2085)

The vial was then closed and shaken for 6 seconds before being let still to react (PIR reaction, Isocyanate index-2562). A gel was formed after about 1 hour and ageing was carried out for a total of 3 days.

The vial was then opened to let the solvent evaporate until constant weight (~2 days) to form a xerogel.

The density of the xerogel was around 120 kg/m$^3$. Porosity was around 90%. Average pore diameter was around 5 µm. The xerogel was cut in its center and a drop of water placed on the exposed internal surface was readily absorbed by the xerogel. This is a non hydrophobic PIR xerogel.

Example 1: Synthesis of a Superhydrophobic PIR Xerogel According to the Invention with a Mono Aminopropyl Polydimethylsiloxane Molecule (2% of MDI Mass)

The xerogel was prepared by mixing the following chemicals in a glass vial:
1/0.5 g of PIR catalyst solution (10 wt % Dabco® K15 in acetone)
2/7.6 g of acetone
3/0.90 g of n-pentane
4/1 g of polymeric MDI (Suprasec® 2085)
5/0.02 g of mono aminopropyl polydimethylsiloxane (MCR-A11)

The vial was then closed and shaken for 6 seconds before being let still to react (PIR reaction, Isocyanate index-2375). A gel was formed after about 1 hour and ageing was carried out for a total of 3 days.

The vial was then opened to let the solvent evaporate until constant weight (~2 days) to form a xerogel.

The density of the xerogel was around 130 kg/m$^3$. Porosity was around 89%. Average pore diameter was around 5 µm. The xerogel was cut in its center and a drop of water placed on the exposed internal surface was not absorbed. On the contrary, the drop rolled off of the surface without wetting it. This is a superhydrophobic PIR xerogel.

Example 2: Synthesis of a Superhydrophobic PIR Xerogel with Mono Aminopropyl Polydimethylsiloxane (10% of MDI Mass)

A PIR xerogel was prepared by mixing the following chemicals in a glass vial:
1/0.5 g of PIR catalyst solution (10 wt % Dabco® K15 in acetone)
2/7.6 g of acetone
3/0.90 g of n-pentane
4/1 g of polymeric MDI (Suprasec® 2085)
5/0.1 g of mono aminopropyl polydimethylsiloxane (MCR-A11)

The vial was then closed and shaken for 6 seconds before being let still to react (PIR reaction, Isocyanate index~1837). A gel was formed after about 1 hour and ageing was carried out for a total of 3 days.

The vial was then opened to let the solvent evaporate until constant weight (~2 days) to form a xerogel.

The density of the xerogel was around 220 kg/m$^3$. Porosity was around 82%. Average pore diameter was around 5 µm. The xerogel was cut in its center and a drop of water placed on the exposed internal surface was not absorbed. On the contrary, the drop rolled off of the surface without wetting it. This is a superhydrophobic PIR xerogel.

Example 3: Synthesis of a Superhydrophobic PIR Xerogel with Mono Aminopropyl Polydimethylsiloxane (10% of MDI Mass)

A PIR xerogel was prepared by mixing the following chemicals in a glass vial:
1/0.75 g of PIR catalyst solution (10 wt % Dabco® K15 in acetone)
2/6.92 g of acetone
3/0.84 g of n-pentane
4/1.5 g of polymeric MDI (Suprasec® 2085)
5/0.15 g of mono aminopropyl polydimethylsiloxane (MCR-A11)

The vial was then closed and shaken for 6 seconds before being let still to react (PIR reaction, Isocyanate index-1837). A gel was formed after about 1 hour and ageing was carried out for a total of 3 days.

The vial was then opened to let the solvent evaporate until constant weight (~2 days) to form a xerogel.

The density of the xerogel was around 650 kg/m$^3$. Porosity was around 46%. Average pore diameter was below 500 nm. The xerogel was cut in its center and a drop of water placed on the exposed internal surface was not absorbed. On the contrary, the drop rolled off of the surface without wetting it. This is a superhydrophobic PIR xerogel.

Example 4: Synthesis of a Superhydrophobic PIR Xerogel with Mono Aminopropyl Polydimethylsiloxane (10% of MDI Mass)

A PIR xerogel was prepared by mixing the following chemicals in a glass vial:
1/1 g of PIR catalyst solution (10 wt % Dabco® K15 in acetone)
2/6.21 g of acetone
3/0.79 g of n-pentane
4/2 g of polymeric MDI (Suprasec® 2085)
5/0.2 g of mono aminopropyl polydimethylsiloxane (MCR-A11)

The vial was then closed and shaken for 6 seconds before being let still to react (PIR reaction, Isocyanate index-1837). A gel was formed after about 1 hour and ageing was carried out for a total of 3 days.

The vial was then opened to let the solvent evaporate until constant weight (~2 days) to form a xerogel.

The density of the xerogel was around 600 kg/m$^3$. Porosity was around 50%. Average pore diameter was below 500 nm. The xerogel was cut in its center and a drop of water placed on the exposed internal surface was not absorbed. On the contrary, the drop rolled off of the surface without wetting it. This is a superhydrophobic PIR xerogel.

Comparative Example 2: Synthesis of a Non Hydrophobic PIR Xerogel

The xerogel was prepared by mixing the following chemicals in a glass vial:

1/0.5 g of PIR catalyst solution (10 wt % Dabco® K15 in acetone)
2/7.6 g of acetone
3/0.90 g of n-pentane
4/1 g of polymeric MDI (Suprasec® 2085)
5/0.02 g n-butanol The vial was then closed and shaken for 6 seconds before being let still to react (PIR reaction, Isocyanate index-1305). A gel was formed after about 1 hour and ageing was carried out for a total of 3 days.

The vial was then opened to let the solvent evaporate until constant weight (~2 days) to form a xerogel.

The density of the xerogel was around 135 kg/m$^3$. Porosity was around 89%. Average pore diameter was around 5 µm. The xerogel was cut in its center and a drop of water placed on the exposed internal surface was readily absorbed by the xerogel. This is a non hydrophobic PIR xerogel.

The invention claimed is:

1. A process for making a hydrophobic isocyanate based organic porous material having water repellent properties, and a water contact angle >90°, wherein the hydrophobic isocyanate based porous material comprises a cross-linked porous network structure comprising: polyurethane, polyisocyanurate, polyurea, or a combination thereof; and a hydrophobic compound covalently bonded within the porous network, said process comprising;
   a) providing a polyisocyanate compound;
   b) optionally, providing an isocyanate-reactive compound;
   c) optionally, providing at least one catalyst compound promoting polyurethane, polyurea, and/or polyisocyanurate formation;
   d) providing a first solvent selected from the group consisting of a hydrocarbon, a dialkyl ether, a cyclic ether, a dialkyl ketone, an alkyl alkanoate, a hydrochlorocarbon, a chlorofluorocarbon, a halogenated aromatic, an aromatic, a fluorine-containing ether, N-methyl pyrrolidone, and a combination thereof;
   e) providing a hydrophobic compound having a solubility in water <10 g/L at 20° C., at least 1 isocyanate-reactive group, and no isocyanate groups, said hydrophobic compound is different from the isocyanate-reactive compound optionally provided in step b) and is able to impart hydrophobicity to the porous material obtained in a subsequent step j), wherein said hydrophobic compound is selected from the group consisting of siloxanes, polyethylene, polypropylene, polybutadiene, polyisoprene, or combinations thereof;
   f) optionally, providing further additives;
   g) combining the compounds provided in steps a), d), e) and optionally b) and/or c) and/or f) at a temperature of about 10° C. to about 50° C. to form a gel comprising a porous cross-linked polyurethane, polyurea, or polyisocyanurate network having the hydrophobic compound covalently bonded in the network, wherein the hydrophobic compound is covalently bonded in the network during step g;
   h) optionally, removing unreacted species;
   i) optionally, exchanging the first solvent with a second solvent; and
   j) removing the first solvent or second solvent from the porous cross-linked polyurethane, polyurea, or polyisocyanurate network in order to obtain the porous material;

and wherein the porous material is an aerogel, a xerogel, or cryogel.

2. The process according to claim 1, wherein the hydrophobic porous material has superhydrophobic properties and a water contact angle >150°.

3. The process according to claim 1, wherein the hydrophobic porous material comprises:
   50-99.9% by weight polyurethane, polyisocyanurate, or polyurea calculated on the total dry weight of the hydrophobic porous material.

4. The process according to claim 1, wherein said hydrophobic compounds are incorporated within the porous structure by means of a urethane and/or urea bonding.

5. The process according to claim 1, wherein the hydrophobic porous material cross-linked porous network structure has the following properties:
   Porosity: 20 to 99%;
   Density: lower than 800 kg/m$^3$; and
   Average pore diameter: 0.1 nm to 1 mm.

6. The process according to claim 1, wherein the hydrophobic porous material has a lambda value under atmospheric pressure in the range 9-50 mW/m.K at 10° C. together with a density in the range of 50-300 kg/m$^3$.

7. The process according to claim 1, wherein the amount of hydrophobic compound is in the range of 0.1 to 30%, by weight calculated on the total weight of the compounds provided in steps (a) and (e) and, when present, steps (b), (c), and/or (f).

8. The process according to claim 1, wherein the porous material is a monolithic gel and the process further comprising, after the step g), a step wherein the obtained gel is optionally broken or grinded into particles having smaller dimensions than the obtained porous material.

9. The process according to claim 1, further comprising, after step g), a step wherein the porous material is aged is performed.

10. The process according to claim 1, wherein the polyisocyanate compound is an organic polyisocyanate selected from the group consisting of hexamethylene diisocyanate, m-phenylene diisocyanate, tolylene-2,4-diisocyanate, tolylene-2,6-diisocyanate, diphenylmethane-4,4'-diisocyanate, or combinations thereof.

11. The process according to claim 1, wherein the optional isocyanate-reactive compound, when present, is selected from the group consisting of a monoamine compound, a polyamine compound, an aromatic or aliphatic polyether polyol compound, an aromatic or aliphatic polyester polyol compound, or combinations thereof.

12. The process according to claim 1, wherein in step g) the compounds are added to a reaction vessel and the compounds are mixed at temperatures of about at least 10° C. below the boiling point of the solvent used in step d) by shaking the reaction vessel or by slowly stirring the compounds in the reaction vessel.

13. The process according to claim 1, wherein the at least one catalyst compound, when present, is selected from the group consisting of quaternary ammonium hydroxides, quaternary salts, alkali metal or alkaline earth metal hydroxides, alkali metal or alkaline earth metal alkoxides, and alkali metal or alkaline earth metal carboxylates, lead octoate, and symmetrical triazine derivatives, and wherein the obtained isocyanate based organic aerogel/xerogel/cryogel is prepared at an isocyanate index greater than 100.

14. The process according to claim 1, wherein the at least one catalyst compound is selected from the group consisting of N,N-dimethylcyclohexylamine, organometallic compounds, and alkali metal salts, and wherein the isocyanate based organic aerogel/xerogel/cryogel is prepared at an isocyanate index in the range of 50-200.

15. The process according to claim 1, wherein the step of removing the solvent in step j) is performed by drying the porous material until the weight of the porous material remains constant by using supercritical $CO_2$, evaporating the organic solvents being present in the gel by air-drying under ambient pressure and ambient temperature, drying under vacuum, drying in an oven at elevated temperatures, microwave drying, radiofrequency drying, sublimation, freeze drying, or any combination thereof.

16. The process according to claim 1, wherein the first solvent used in step d) is selected from the group consisting of a hydrocarbon, a dialkyl ether, a ketone and a combination thereof.

17. The process according to claim 1, wherein the second solvent used in step i), when present, is selected from the group consisting of hydrocarbons, dialkyl ethers, cyclic ethers, ketones, alkyl alkanoates, aliphatic hydrofluorocarbons, cycloaliphatic hydrofluorocarbons, hydrochlorofluorocarbons, chlorofluorocarbons, hydrochlorocarbons, halogenated aromatic compounds, fluorine-containing ethers, and combinations thereof.

* * * * *